(12) United States Patent
Ratcliffe et al.

(10) Patent No.: US 10,659,427 B1
(45) Date of Patent: May 19, 2020

(54) CALL PROCESSING CONTINUITY WITHIN A CLOUD NETWORK

(71) Applicant: AT&T Intellectual Property I, L.P., Atlanta, GA (US)

(72) Inventors: Mark A. Ratcliffe, Oakhurst, NJ (US); Chaoxin Qiu, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/288,467

(22) Filed: Feb. 28, 2019

(51) Int. Cl.
*G06F 15/173* (2006.01)
*H04L 29/12* (2006.01)
*G06F 9/455* (2018.01)

(52) U.S. Cl.
CPC ...... *H04L 61/1511* (2013.01); *G06F 9/45558* (2013.01); *H04L 61/6059* (2013.01); *G06F 2009/45595* (2013.01)

(58) Field of Classification Search
CPC ............. H04L 61/1511; H04L 61/6059; G06F 9/45558; G06F 2009/45595; G06F 2009/4557
See application file for complete search history.

(56) References Cited

U.S. PATENT DOCUMENTS

| | | | |
|---|---|---|---|
| 8,989,000 | B2 | 3/2015 | Draznin et al. |
| 9,794,352 | B2 | 10/2017 | Qiang |
| 9,992,078 | B1 | 6/2018 | Zemlerub |
| 10,075,890 | B2 | 9/2018 | Rahman |
| 10,164,944 | B1 | 12/2018 | Felstaine et al. |
| 2017/0170990 | A1* | 6/2017 | Gaddehosur ........ H04L 67/1031 |
| 2017/0310755 | A1 | 10/2017 | Hoernes et al. |
| 2017/0318087 | A1* | 11/2017 | Qiu ........................ G06F 9/442 |
| 2017/0366428 | A1 | 12/2017 | Shaw et al. |
| 2018/0077080 | A1 | 3/2018 | Gazier et al. |
| 2018/0307550 | A1 | 10/2018 | Parikh et al. |
| 2018/0316779 | A1 | 11/2018 | Dowlatkhah et al. |
| 2018/0337931 | A1 | 11/2018 | Hermoni et al. |
| 2019/0243719 | A1* | 8/2019 | Yadav ................. G06F 11/1448 |

OTHER PUBLICATIONS

Carella et al.; "Cloudified IP Multimedia Subsystem (IMS) for Network Function Virtualization (NFV)-based architectures"; IEEE Computers and Communication Symposium; 2014; 6 pages.

\* cited by examiner

*Primary Examiner* — Jonathan A Bui
(74) *Attorney, Agent, or Firm* — BakerHostetler (57) ABSTRACT

A system may assist in moving a communication session in a stable state from a virtual network function serving that communication session to another virtual network function at that same site or another site, such as another cloud data center.

20 Claims, 8 Drawing Sheets

CALL PROCESSING CONTINUITY WITHIN A CLOUD NETWORK

BACKGROUND

When a communication session is in a stable state in the internet protocol multimedia subsystem (IMS) network that provides voice over wireless (e.g., voice over long term evolution) communication services, a set of virtual network functions maintains the session state for the ongoing communication session. Thus, actions associated with the communication session traverse the same virtual network functions. For example, a 3GPP multiple media telephony application server (MMTel-AS or referred herein as TAS) maintains the state of a stable communication session for which the Session Initiation Protocol (SIP) is used to establish it. If the communication session was part of a three-way call and one of the call legs is to be removed from the call, a SIP Bye message would be sent from the user equipment (UE) to have that call leg removed. Conventionally the Bye message needs to traverse the TAS so it may maintain control of the call and update the call state. If the TAS VNF is shutdown from service, the call state may not be updated which may result in improper call handling (e.g., call detail recording used for billing may not correctly reflect the call duration).

This disclosure is directed to addressing issues in the existing technology.

SUMMARY

A system may assist in moving a communication session in a stable state from a virtual network function serving that communication session to another virtual network function at that same site or another site, such as another cloud data center.

In an example, an apparatus may include a processor and a memory coupled with the processor that effectuates operations. The operations may include obtaining information associated with transition of communication sessions control from a first instance of a virtual network function (VNF) to a second instance of the VNF, the information comprising a threshold time to begin duplication of state data; determining that the threshold time to begin duplication of state data is reached; based on the determining that the threshold time to begin duplication of state data is reached, duplicating state data from a first state database associated with the first instance of the VNF to a second state database associated with the second instance of the VNF; determining that a threshold time to alter connectivity is reached; and based on the determining that the threshold time to alter the connectivity is reached, providing instructions to alter a domain name system (DNS) record for the first instance of the VNF.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

Conventionally, if the telephony application server (TAS) virtual network function (VNF) is shutdown from service, the call state cannot be updated which may result in improper call handling, e.g., call detail recording used for billing may not correctly reflect the call duration. Disclosed herein is a system, method, or apparatus (e.g., the call processing continuity system) that allows for the call state to be made available to another TAS and surrounding upstream VNFs serving a three-way call to be informed of the second TAS that has the call state information. Therefore, the SIP request may be sent to the second TAS for proper mid-call treatment and the communication session may be properly maintained.

By allowing another VNF to have access to communication session state and to take over control of active communication sessions, the disclosed subject matter allows communication services to be managed in a network of cloud datacenters by migrating active communication sessions from one datacenter to another datacenter as needed and without disruption. The disclosed call processing continuity system may simplify operation and management of real-time and mission critical communication services in a cloud environment. For example, call processing continuity system may allow cloud datacenter center operations maintenance activities at both the cloud infrastructure level and service application level without disruption to ongoing customer communications. It may also allow a virtual network function or an entire cloud datacenter to be taken out-of-service without impacting any ongoing communication sessions.

Figure 1:
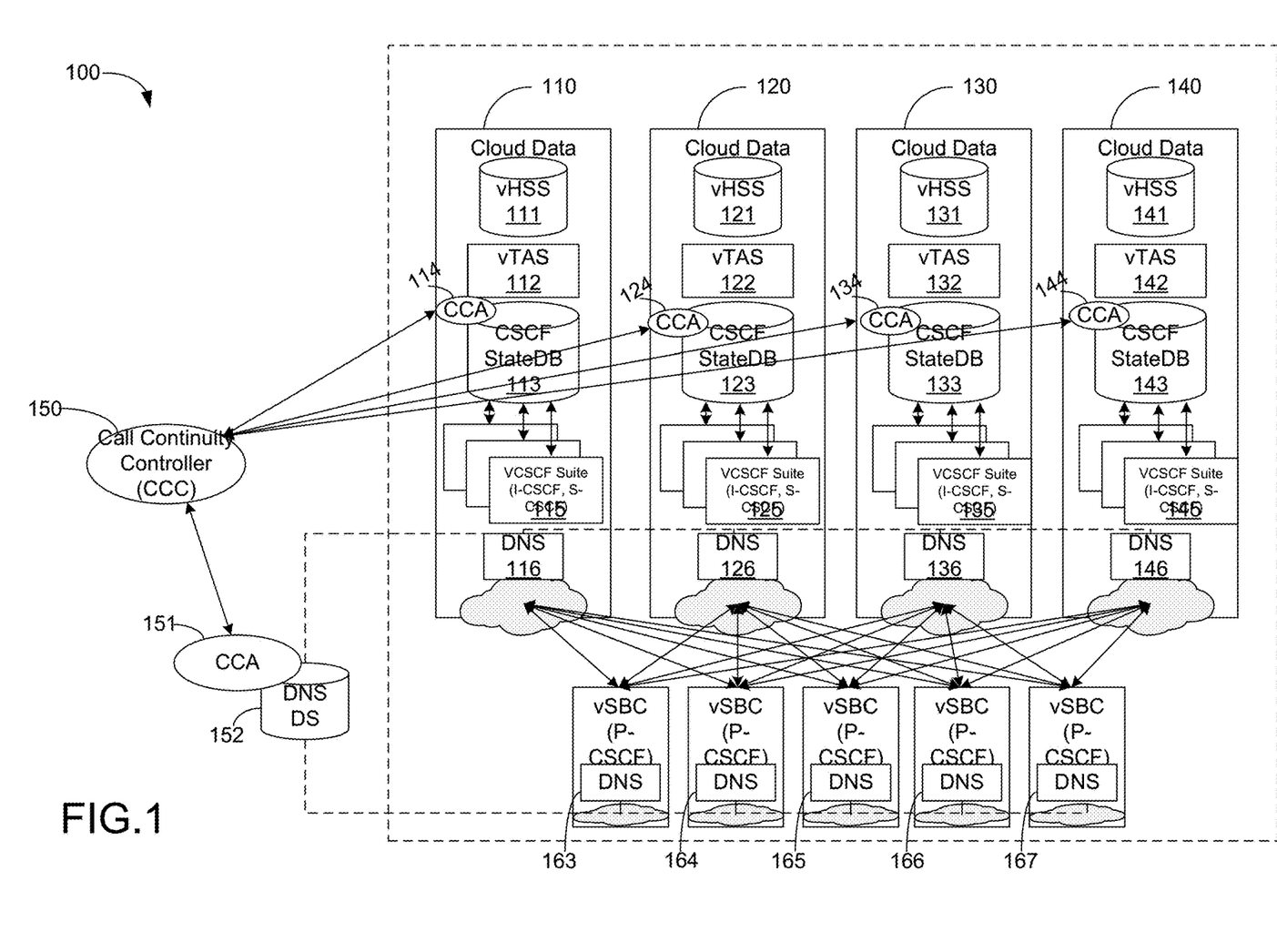
FIG. 1 illustrates an exemplary system for call processing continuity.

FIG. 1 illustrates an exemplary system for call processing continuity. System 100 includes cloud data center 110, cloud data center 120, cloud data center 130, or cloud data center 140. Each cloud data center (e.g., cloud data center 110, 120, 130, 140) may respectively include a vHss (e.g., vHss 111, 121, 131, 141), vTAS (e.g., vTAS 112, 122, 132, 142), CCA (e.g., CCA 114, 124, 134, 144), CSCF State database (e.g., CSCF State database 113, 123, 133, 143), vCSCF (e.g., vCSCF 115, 125, 135, 145), or DNS (e.g., DNS 116, 126, 136, 146). System 100 may include a call continuity controller (e.g., CCC 150) that may communicatively connect with call continuity agents (CCA), such as CCA 114, CCA 124, CCA 134, or CCA 144. System 100 further includes DNS database 152 that may include a CCA 151 and is communicatively connected with DNS 163-DNS 167 of respective vSBC 163-vSBC 167 as well DNS 116, 126, 136, or 146.

CCAs may be implemented as-needed in stateDB instances, DNS databases, or VNF instances to execute the commands from a CCC to support the management of moving communication sessions. There may be multiple types of CCAs. A first CCA may be called StateDB CCA (e.g., CCA 114, 124, 134, 144). For example, CCA 114 may receive a command from CCC 150 and initiate state data replication of its resident stateDB to a target stateDB. A second CCA may be called a DNS CCA (e.g., CCA 151). CCA 151 may receive commands from CCC 150 to alter the DNS records as instructed in order to change the routing of messages by other VNF peers that communicate with the VNF to be shut down ("From" VNF). By replacing the AAAA or A records of the "From" VNF with AAAA or A records of the "To" VNF, the peers of the "From" VNFs may be directed to the "To" VNF after DNS resolution is refreshed.

A third type of CCA may be called a "VNF"_CCA. The "VNF"_CCA may be implemented as needed within specific VNF instances. It may allow CCC 150 to instruct this CCA type to change local configuration within a VNF to change how the VNF sends signaling messages toward the next-hop peer VNFs. The prefix "VNF" may be replaced by the name of specific VNFs, such as vSBC 153, vCSCF 115, vTAS 112, etc. (for example, SBC_CCA, TAS_CCA, CSCF_CCA, etc.). In an example use case, if vSBC 153 is originally configured to send session initiation protocol (SIP) requests to the "From" VNFs that will need to be shutdown, CCC 150 may send instructions to the SBC_CCA (not shown) to modify the configuration in vSBC 153 such that it sends SIP requests to the "To" VNFs. VNF-specific CCAs may be used as an alternate approach, if needed, rather than use the DNS method herein (e.g., DNS_CCA) which alters the connectivity and signaling flows originally sent to the "From" VNFs that need to be shut down and pivots the connectivity and signaling flows to the "To" VNFs.

Herein, the disclosed call processing continuity system is described using an exemplary implementation for vCSCF. The same design may be applied to other VNFs in the network, including vTAS and other VNFs that may not be shown in simplified network view of FIG. 1.

VNFs that process and maintain communication sessions should separate the communication session processing logic from the communication state. As such, conventional networks may be modified with the addition of a state database. For example, vCSCF 115, 125, 135, 145 may be attached locally to a state database (stateDB), e.g., CSCF State database 113, 123, 133, 143, that is used to store state information for communication sessions maintained by those vCSCFs. However while each site has multiple vCSCF instances that would store communication session state information in a collocated state database, the implementation does not copy communication state information to other state databases in other sites. This is because a network serving more than 80 million subscribers and millions of communication sessions will require storage of a massive amount of state information data. To replicate this state data across sites remotely over a wide-area-network on a continuous basis would be costly. Further, communication sessions commonly do not last long (for example, the average call hold-time is about 3-5 minutes). As such, state information for communication sessions become stale after a communication session terminated. Replicating state data across sites in "sunny day" scenarios with infrequent need may not be cost effective.

The network design of system 100 may use DNS to manage the connectivity between network functions. However, in traditional network design, the connectivity between network functions is usually managed by a combination of local configuration within a network function and the DNS. In a cloud data center, the virtual network functions become more dynamic. With DNS it may be easier to manage the connectivity between VNFs when some VNFs are instantiated into a cloud data center and some other VNFs are removed from a cloud data center. DNS design typically differentiates between DNS resolvers (e.g., DNS 116, 126, 136, 146 or DNS 163-DNS 167) and the DNS Database (DB) 152 that stores DNS records, typically implemented using a Lightweight Directory Access Protocol (LDAP) database. Changes to DNS records may be made to DNS DB 152 and may propagate to the DNS resolvers.

Figure 2:
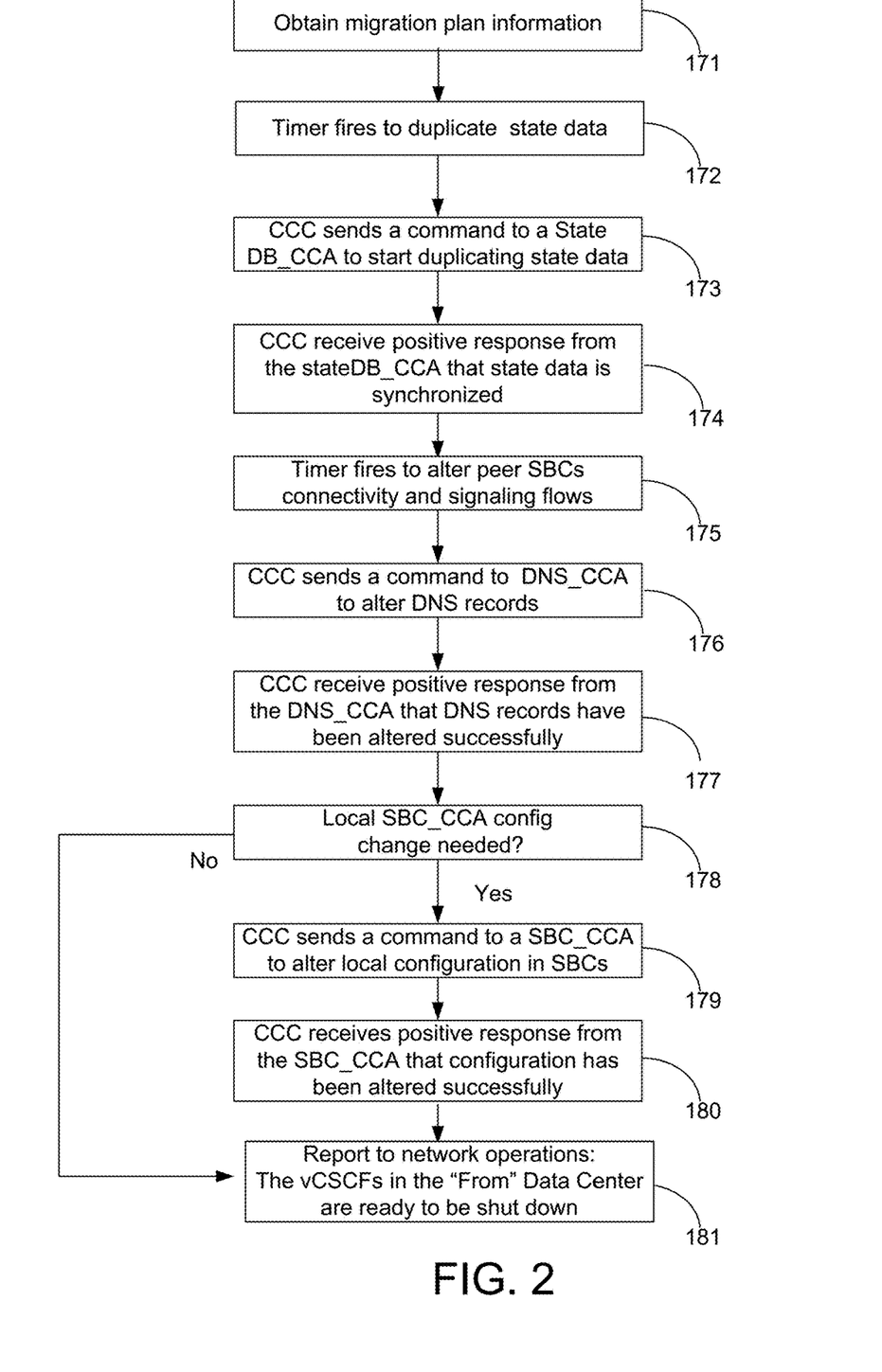
FIG. 2 illustrates an exemplary method for call processing continuity.

CCC 150 may allow the network operations of a service provider to issue one or more commands to appropriate CCAs to initiate transition of management responsibility for existing communication sessions from one or more VNFs instances to another set of VNF instances. FIG. 2 illustrates an exemplary method for call processing continuity. FIG. 1 and FIG. 2 uses vCSCF shutdown as an example but can be applied to other VNFs in a cloud data center. The process may accomplish the following: (1) copy vCSCF state data to another stateDB at another site, and (2) instruct other peer VNFs to send signaling messages to other vCSCFs at the same second site.

In an example scenario there may be a plan to shutdown a vCSCF 115 for maintenance. At step 171, information associated with transition of communication sessions control from one set of VNF instances to another set of VNF instances may be obtained. There may be a first VNF instance of a first type and a second VNF instance of first type. For example, moving for vCSCF instance 115 and its associated stateDB 113 to vCSCF instance 125 and its associated stateDB 123. The information of step 171 may be called migration plan information. The migration plan information may include: a) a set time to start duplication of state data from one state database (stateDB), such as stateDB 113, to another stateDB (e.g., stateDB 123); b) identification of the duplication source stateDB (e.g., stateDB 113) and target stateDB (e.g., stateDB 123); c) call control transition original and target VNF, e.g., "From" VNFs and "To" VNFs (From VNF=vCSCF 115; To VNF=vCSCF 125); or d) set time to start a call control transition from a set of VNF instances to another set of VNF instances (e.g., start time to pivot peer connectivity). State data may include the following: the originating caller's identity, the destination caller's identity, the call leg from the prior hop network element address, the next hop network element for routing call set up messages, the time of the call origination, or the state of the call (active, on-hold, alerting phase, etc.), among other things.

With continued reference to FIG. 2, at step 172, it is determined that the threshold set time (e.g., 5:00 AM) to start duplication of state data is reached. At step 173, based on the set time being reached, CCC 150 sends instructions to CCAs of stateDBs (e.g., CCA 114 or CCA 124) to start duplicating state data from stateDB 113 to stateDB 123. CCA 114 may duplicate and keep the synchronized state data to CCA 124. CCA 124 may integrate the state data with the state DB 123. At step 174, CCC 150 may receive a response from CCA 114 or CCA 124 that state data is synchronized. At step 175, it is determined that the threshold set time (e.g., 5:05 AM) to alter connectivity or signaling flows is reached. The altered connectivity or signaling flows may be based on the duplicated state data of step 173. At step 176, based on the set time being reached, CCC 150 sends instructions to a DNS_CCA (e.g., CCA 151) to alter DNS records, which is shown in Table 1 as an example. Issue commands to CCAs of designated DNS DBs to modify the DNS records. For example, the fully qualified domain name (FQDN) or AAAA/A records of the "From" VNFs and "To" VNFs (e.g., "From" vCSCF 115, "To" vCSCF 125). AAAA is IPv6 address record and A is IPv4 address record. At step 177, CCC 150 may receive a response from CCA 151 that DNS records have been altered successfully.

TABLE 1

| Before | After (Altered) |
| --- | --- |
| www.vSCF115.net to 1.1.1.1 | www.vSCF115.net to www.vSCF125.net |
| www.vSCF125.net to 1.1.1.2 | www.vSCF125.net to 1.1.1.2 |

At step 178, if there is no need for a local SBC_CCA configuration change, then step 181 may be executed. At step 181, there may be a separate message that alerts network operations that vCSCF 115 or other equipment in data center 110 is ready to be shutdown. The message may be sent to a device that displays the message. Also the alert may trigger automatic shutdown or reconfiguration of the "From" VNFs (e.g., vCSCF 115).

At step 178, if there is a need for a local SBC_CCA configuration change, then step 179 may be executed. At step 179, CCC 150 may send a command to SBC_CCA to alter local configurations in vSBCs, which may include "From" vCSCFs (FQDNs or AAAA/A records) or "To" vCSCFs (FQDNs or AAAA/A records). At step 180, responsive to step 179, CCC 150 may receive a response from SBC_CCA that configuration has been altered successfully. Then, responsive to step 180, at step 181, there may be a separate message that alerts network operations that vCSCF 115 or other equipment in data center 110 is ready to be shutdown.

Figure 3:
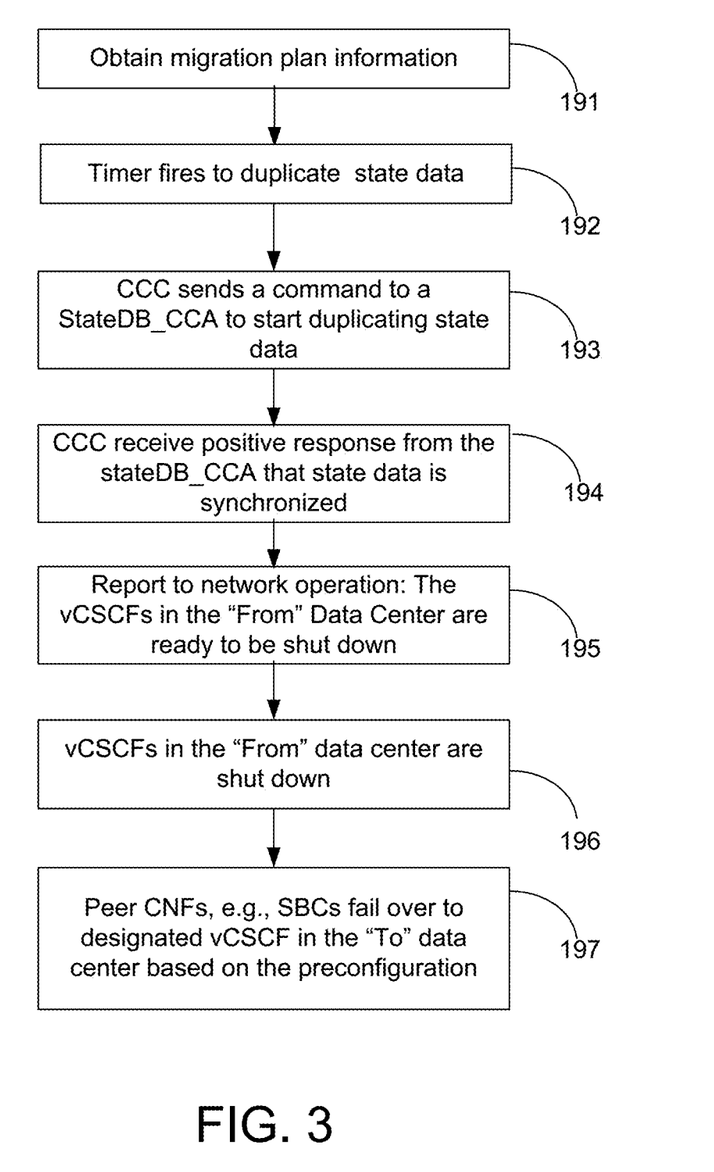
FIG. 3 illustrates an alternate exemplary method for call processing continuity.

It is possible to implement this call processing continuity without DNS_CCAs and VNF_CCAs with some trade-offs. For example if the secondary VNF is invoked automatically due to failure of the primary, this may result in failure or degraded call handling for calls where the state data has not yet been replicated. FIG. 3 illustrates an alternate exemplary method for call processing continuity.

In an example scenario there may be a plan to shutdown a vCSCF 115 for maintenance. At step 191, information associated with transition of communication sessions control from one set of VNF instances to another set of VNF instances may be obtained. This information may also be called migration plan information. The migration plan information may include: a) a set time to start duplication of state data from one state database (stateDB), such as stateDB 113, to another stateDB (e.g., stateDB 123); b) identification of the duplication source stateDB (e.g., stateDB 113) and target stateDB (e.g., stateDB 123); c) call control transition original and target VNF, e.g., "From" VNFs and "To" VNFs; or d) set time to start a call control transition from a set of VNF instances to another set of VNF instances (e.g., start time to pivot peer connectivity).

With continued reference to FIG. 3, at step 192, it is determined that the threshold set time (e.g., 5:00 AM) to start duplication of state data is reached. At step 193, based on the set time being reached, CCC 150 sends instructions to CCAs of stateDBs (e.g., CCA 114 or CCA 124) to start duplicating state data from stateDB 113 to stateDB 123. At step 194, CCC 150 may receive a response from CCA 114 or CCA 124 that state data is synchronized.

At step 195, there may be a separate message that alerts network operations that vCSCF 115 or other equipment in data center 110 is ready to be shutdown. At step 196, based on the message of step 195, vCSCFs in the "From" data center (e.g., vCSCF 115 of cloud data center 110) are shutdown. At step 197, responsive to the shutdown of step 196, peer VNFs (e.g., SBCs) fail over to designated vCSCF in the "To" data center (e.g., cloud data center 120) based on the pre-configuration. Pre-configuration may be a set of alternate vCSCF that were provisioned as alternates (secondary (fail-over) peers) when the vSBC was originally configured to communicate to the vCSCF (e.g., primary & alternate).

With continued reference to the subject matter of FIG. 3, in summary for this alternative implementation, VNFs are pre-configured with a secondary (fail-over) peer target for call signaling messages (this may be part of the initial configuration of the VNF). In addition, when VNFs in a cloud data center are to be shutdown, CCC 150 may instruct StateDB_CCA to start to replicate state data to the designated stateDB in the predefined failover site. After the state data is synchronized, the VNFs in the data center are ready to be shutdown. All other peers detect that their primary target VNFs are no longer responsible and failover to designated VNFs. These failover VNFs can use the replicated state data to process signaling messages for existing communication sessions. This detection may occur by a time-out or a failure response to the SIP message for the call being sent to the "From" primary VNF.

Per 3GPP IMS standards, vCSCF may include the S-CSCF function that is responsible for User Equipment (UE) registration. UE of a user needs to maintain valid registration state before calls may be processed. As such, the vCSCF-StateDB may include UE registration data and call state data. When call state data is to be replicated to another vCSCF-stateDB, both UE's registration data and call state data shall be replicated. This includes UE registration data for UEs not engaged in active calls.

A second implementation detail specific for the vCSCF is now described. When a SIP request arrives at the designated "failover" vCSCF, the vCSCF retrieves registration state data and call state data. It is also possible that the SIP request is a SIP registration request. Since the vCSCF can retrieve existing registration data for the UE, the registration request can be processed. No matter whether it is a registration request or a call signaling request, the S-CSCF function within the designated vCSCF has effectively become the serving S-CSCF for the user. As such, the S-CSCF needs to send a Diameter request (using the 3GPP IMS Cx Diameter application standard) to update the HSS with the new S-CSCF server name in the HSS database. These additional processing details are illustrated in FIG. 4.

Further in a large service network in which dozens of cloud data centers are deployed with vCSCF VNFs to serve millions of subscribers, there could be various exceptions that result in an incoming SIP request being sent to the wrong vCSCF in other cloud data centers. For example, this use case can happen due to a race condition when a terminating SIP request is destined to a user who has moved to a new designated failover data center. As such, additional call processing logic can be implemented in the vCSCF-stateDB and vCSCF itself. When a third vCSCF receives a SIP request and attempts to retrieve registration state and call state data from the fail-to vCSCF stateDB, the stateDB may return a response that may provide the correct fail-to vCSCF ID. The third vCSCF may then forward the SIP request to the correct fail-to vCSCF. This scenario is illustrated in step 207 through step 209 of FIG. 4.

Figure 4:
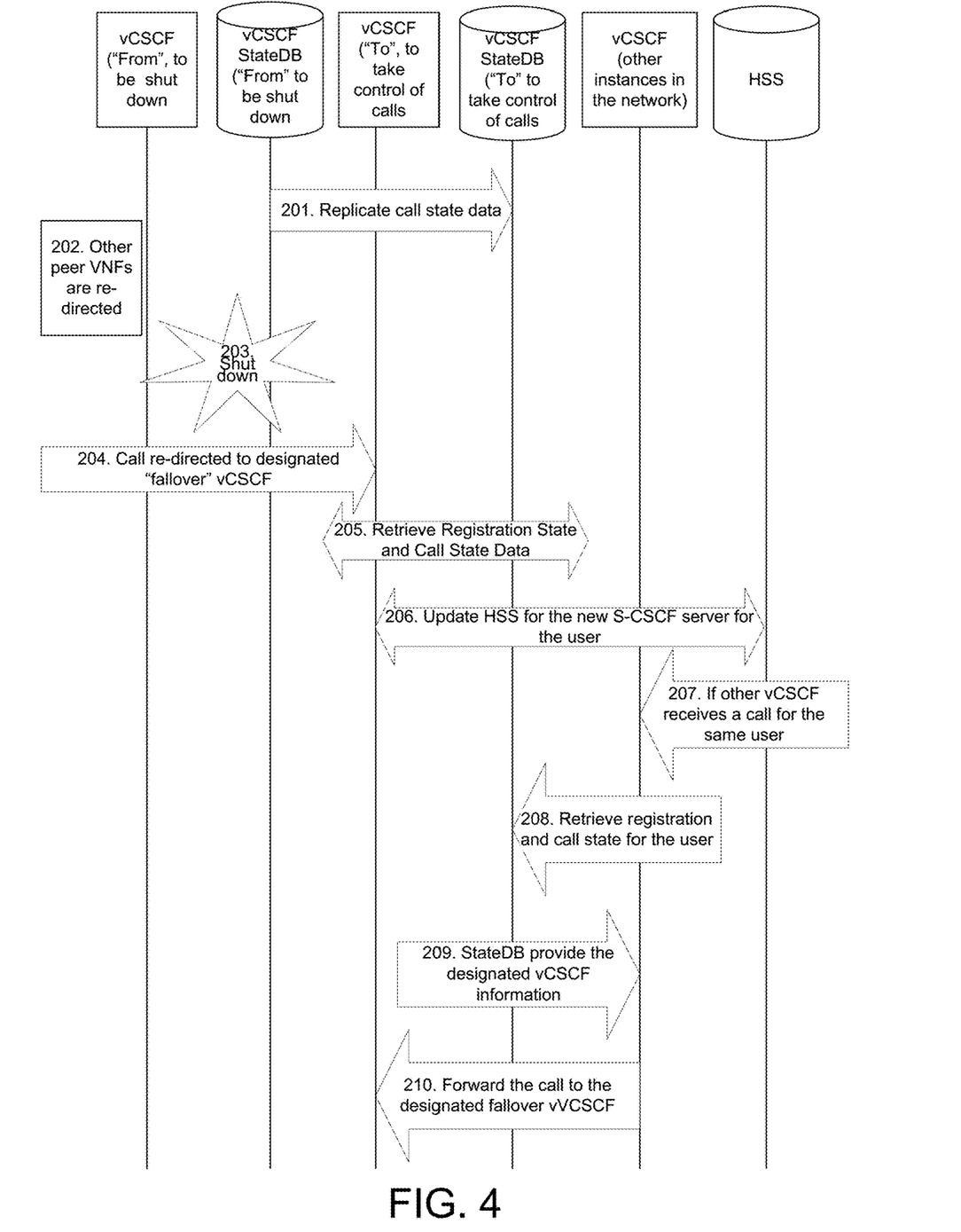
FIG. 4 illustrates an exemplary method flow for call processing continuity associated with vCSCF.

FIG. 4 illustrates an exemplary method flow for call processing continuity associated with vCSCF. In an exemplary scenario, vCSCF 115 is planned to be shutdown. At step 201, stateDB 113 sends data to stateDB 123 in order to replicate call state data. At step 202, other peer VNFs are redirected. For example, the vSBCs that would originally use vCSCF 115 are now redirected to use vCSCF 125. At step 203, a shutdown occurs for vCSCF 115 and associated stateDB 113. At step 204, an incoming call is re-directed to designated failover vCSCF (e.g., vCSCF 125). At step 205, vCSCF 125 obtains registration state and call state data. vCSCF 125 has now assumed the role of the registrar for the UE. As such it will also process calls that were formerly performed by vCSCF 115. So, it uses this information to process the call. At step 206, there is an exchange of information to update HSS 111 for the new S-CSCF sever 125 for a UE. The HSS that is used is the HSS that has the subscriber profile for the originating UE. If that data was in HSS 111 then that is the HSS that is updated with the new vCSCF 125 that is now the registrar for the UE and processing calls for that UE. At step 207, vCSCF 145 may obtain a call for the same UE. At step 208, stateDB 123 obtains information, such as registration and call state for the UE. At step 209, stateDB 123, based on the information of step 208, provides the designated vCSCF information. At step 208, vCSCF 145 is requesting the registration and call state data for the destination UE as it received a call for that UE but it does not have this information. However, the vCSCF serving the call is 125, so the stateDB provides vCSCF 125 address to redirect the terminating call for processing. At step 210, based on the information of step 209, vCSCF 145 may forward the call to the designated failover vCSCF 125.

The method, systems, and apparatuses disclosed herein may assist in gracefully moving a communication session in a stable state from the Virtual Function (VF) serving that communication session to another VF at that same site or another site. This may be used to address a number of operational and engineering issues. For example, a cloud datacenter that hosts a set of virtual function resources may have to be shutdown or rebooted for upgrades of host hardware, host OS, hypervisors, or Openstack components. In such occasions, virtual network functions in the said datacenter are disrupted. It, in turn, when using conventional systems, may disrupt and likely drop hundreds of thousands of communication sessions (e.g., HD voice calls, IR.94 video calls, conference calls, emergency 911 calls, etc.) these virtual network functions are managing for possibly millions voice over wireless (e.g., VoLTE) users. A technical effect of the disclosed subject matter is that, such active communication sessions shall not be disrupted, especially emergency 911 calls, hotline calls in hostage situations, or long-duration conference calls. Therefore, as disclosed, a method has been developed to migrate a large number of active communication sessions from a cloud datacenter to another cloud datacenter to maintain continuity of active communication sessions before those virtual network functions in the first said cloud datacenter are to be disrupted. Disclosed herein are methods, systems, and apparatuses that may accomplish such tasks.

Our method may also be used to rebalance the communication service traffic across multiple datacenters by migrating a set of selected active communication sessions from one cloud datacenter to another cloud datacenter, or from one cloud zone to another cloud zone within the same cloud datacenter. For example, if one vCSCF is getting too much traffic to process and is near it's engineered limit, this method could be used to redirect calls to vCSCF that are not as fully loaded to then effectively balance the traffic in the network so the heavily loaded vCSCF does not go into overload and block calls. A certain amount (threshold) traffic, errors, blocked calls, or the like may trigger this method to rebalance.

The concept of separating call processing VNFs from call state database is disclosed herein. There is a possibility that a call state database may be implemented in such a manner that the call state information is always replicated into another call state database in a different site to provide geographical redundancy of virtual network functions. Such a proposal may be too expensive and inefficient since most call state information is short-lived as typical communication sessions last about 3 minutes. Duplicating real-time call state information for hundreds of millions of communication sessions in "sunny day" (non-failure) circumstances requires extremely high bandwidth and a large call state database repository. In the "sunny day" scenario, the duplicated call state data are not needed and will be discarded after a communication session ends. Duplicating call state information to a repository at a different site may be better used when disruptive maintenance is scheduled. The disclosed call processing continuity subject matter of FIG. 1-FIG. 4 may be more cost effective in this regard. Call processing continuity subject matter of FIG. 1-FIG. 4 may utilize duplicated call state information to maintain continuity of existing communication sessions when a set of serving virtual network functions are shutdown. Herein the methods allow virtual network functions to coordinate their call processing responsibilities when call state information is moved to another state database and the original VNF responsible for the communication session is shutdown.

The below description provides additional information about example network for call processing. With reference to FIG. 1, a Session Border Controller (SBC) is a device regularly deployed in Voice over Internet Protocol (VoIP) networks to exert control over the signaling and usually also the media streams involved in setting up, conducting, and tearing down telephone calls or other interactive media communications. SBCs focus on the borders between two service provider networks in a peering environment and includes significant deployments between a service provider's access network and a backbone network to provide service to residential or enterprise customers. Session usually refers to communication between two parties. In the context of telephony, this would be a call. Each call may include one or more call signaling message exchange that controls the call, and one or more call media stream which carries the audio, video, or other data along with information of call statistics and quality. Together, these streams may be considered to make up a session. It is the job of a session border controller to exert influence over the data flows of sessions. Session border controllers often provide measurement, access control, and data conversion facilities for the calls they control.

According to 3GPP IMS standard, a Session Border Controller can typically implement Proxy-Call Session Control Function (P-CSCF). Together with Interrogating-CSCF (I-CSCF) and Serving-CSCF (S-CSCF), they make up the major functional components of a CSCF. Several roles of SIP servers or proxies, collectively called Call Session Control Function (CSCF), are used to process SIP signaling packets in the IMS.

The Telephony Application Server (TAS) refers to an entity in a telephone network that carries out functions that are not directly related to the routing of messages through the network.

Such functions can include in-network answering machines, toll-free "800" (freephone) numbers, automatic call forwarding, conference bridges and many other types of applications. In integrated telephone networks, these are mostly implemented as functions in the telephone exchange, but in more open networks such as IP telephony networks based on the SIP protocol, these are often separate computers.

In contexts where it is obvious that one is talking about telephony, such as RFC 3057, one often just calls them "application servers;" this is also common in the context of SIP (for instance in RFC 4240), because proponents argue that SIP is applicable to a much wider range of applications than just telephony.

The application server provides call-termination or subscriber-independent applications. These include such capabilities as local number portability, toll-free call routing resolution, conference bridge services, and unified messaging. The PSTN versions of these applications are frequently provided using toll-free "800" numbers in North America.

Application servers are of two general types, those that are signaling only and those that involve media manipulation. The former are often related to routing resolution as local number portability, toll-free call routing, and other services where the dialed number must be translated to a routable address. An example involving media manipulation would be conference bridge applications. The call steps may include: 1) Each user calls in on a pre-published number; 2) The dialed number is translated into an IP address and named the endpoint of the application server, and the call is routed there; 3) The application server connects to the media server instructing it to play a greeting and collect the conference number; 4) The media server returns the conference number, and the application server instructs the media server to play a prompt to collect the authorization number; or 5) If the digits collected are correct, the application server tells the media server to move this call to a particular conference bridge.

The Home Subscriber Server (HSS) is a master user database that supports the IMS network entities that handle calls. It contains the subscription-related information (subscriber profiles), performs authentication and authorization of the user, and can provide information about the subscriber's location and IP information. In a large network that serves more than 80 million subscribers, typically each site in this diagram will serve 20 to 40 million subscribers with millions of active communication sessions maintained simultaneously. For such service scale, each site typically is deployed with multiple instances of each type of VNF. For example if a vCSCF instance (also called a vCSCF node) supports a capacity of about 5 million subscribers, each site may have 4 to 8 vCSCF nodes running simultaneously. This highlights issues that may be addressed using the call processing continuity subject disclosed herein. If VNFs should be shutdown at a site, the disclosed subject matter may gracefully move ongoing active communication sessions off the VNFs to-be-shutdown and empower other equivalent VNFs in other sites to maintain these communication sessions properly. This may be done based on: 1) replicating communication session state information as-needed, and 2) allowing VNFs in other sites to take over signaling processing for ongoing communication sessions.

The disclosed method, systems, and apparatuses support a number of capabilities to address maintaining communication sessions when a set of virtual network functions are removed from service based on various maintenance considerations in a cloud datacenter. In a first consideration, prior to taking a virtual network function out-of-service, the call state may be duplicated to a designated call state repository. The value that the call state repository is specific to each type of virtual network function. VNFs of the same functionality may share the same call state repository. VNFs of different functionality may have a separate call state repository. Each VNF may be configured to only use its designated call state repository. This call state repository may be: a centralized repository, a regionalized repository for applications that are latency sensitive (e.g., 5G small cloud locations), or a repository that is local and has a direct pairwise relationship with the network element.

In a second consideration, if a call processing signaling message fails to a virtual network function because it has been taken out-of-service, the upstream network function can retry available virtual network functions that have the same call processing functionality. For example, a P-CSCF could route a failed signaling message to another available S-CSCF. Retry targets can be arranged and configured based on the arrangement of the call state repository with regard to being centralized, regionalized, or local repository.

In a third consideration, if a virtual network function receives a signaling message for a communication session but finds no call state information within its normal call state database, it will query its available call state repository to download the call state information. If this is a new request, the call state repository will note which virtual network function had requested the call state data for future requests. The virtual network function that downloaded the call state information may then process the signaling message for the communication session. If the virtual network function is an S-CSCF as defined by the 3GPP IMS standards, it will also notify the Home Subscriber Server (HSS) via Diameter protocol to update its server info with the address of the new S-CSCF that is now serving the subscriber in the communication session. The S-CSCF also downloads the service profile from the HSS for this subscriber In a fourth consideration, after a network function has assumed control of the call state for a communication session in consideration three, if the call state repository receives another request for call state information from a different virtual network function of the same functionality, the call state repository may inform the second virtual network function of the Identity (ID) and address of the first virtual network function that has control of the communication session. The second virtual network function may then redirect the signaling message for that call to the first controlling virtual network function.

Figure 5:
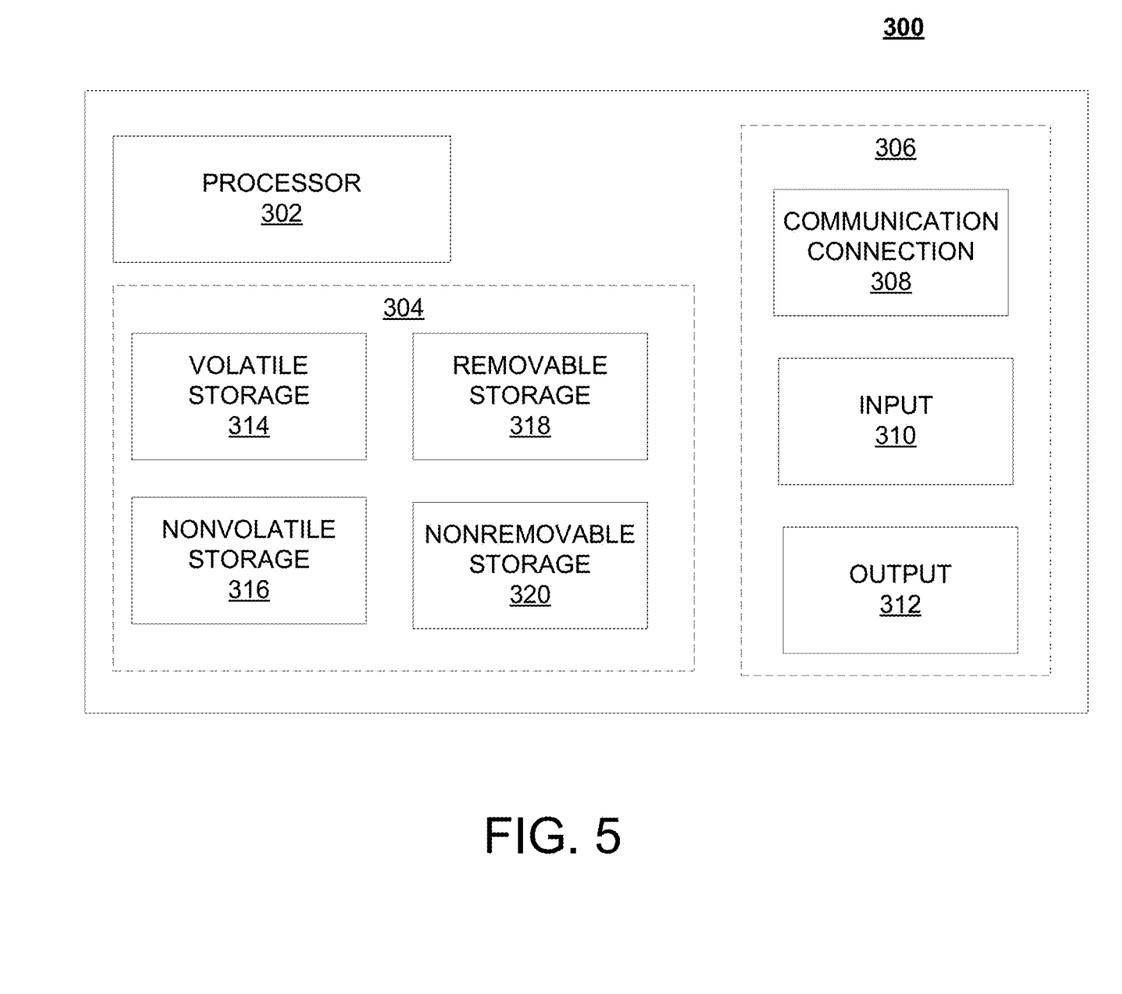
FIG. 5 illustrates a schematic of an exemplary network device.

FIG. 5 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 5 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 5 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 5) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, Zig-Bee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 6:
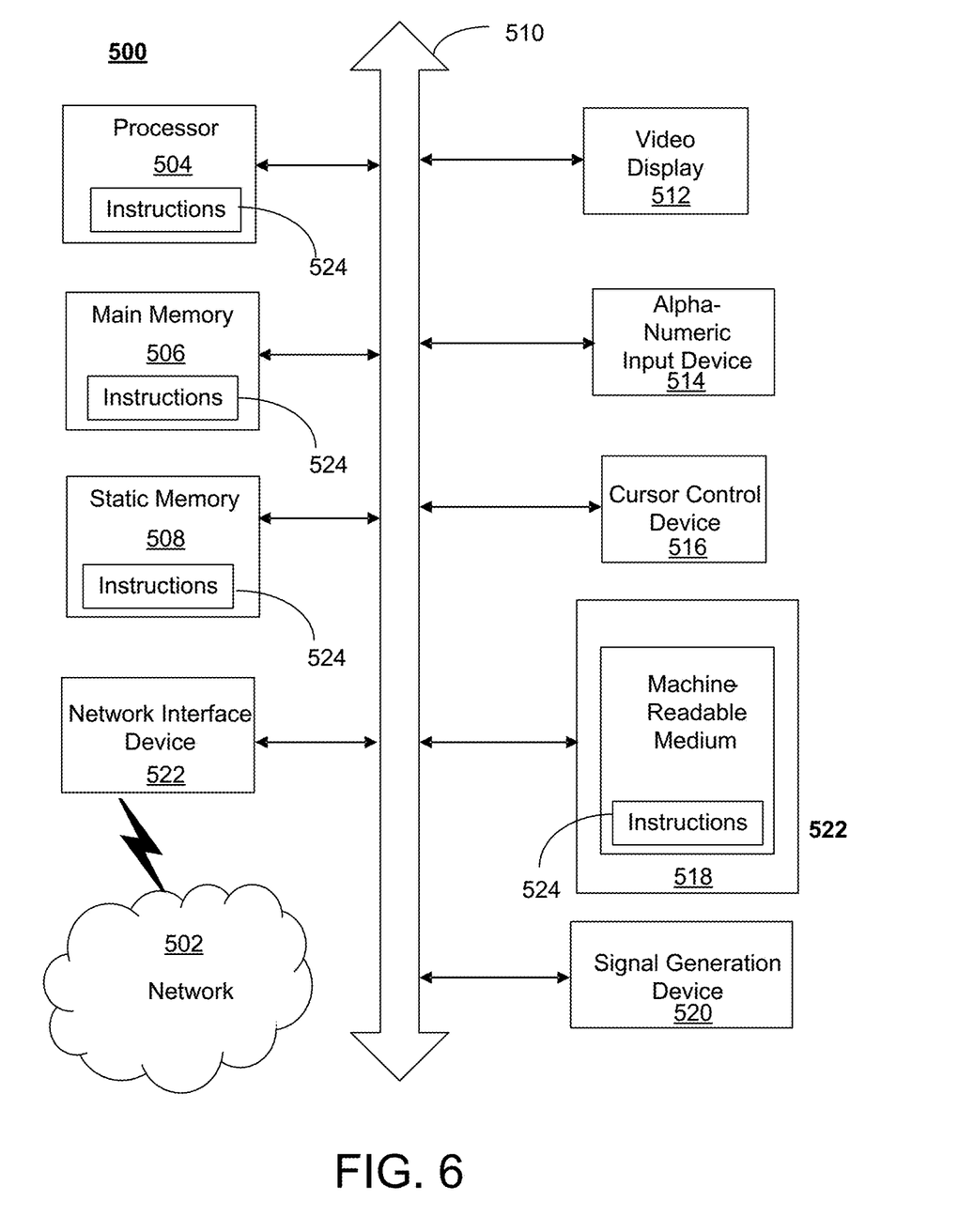
FIG. 6 illustrates an exemplary communication system that provides wireless telecommunication services over wireless communication networks.

FIG. 6 depicts an exemplary diagrammatic representation of a machine in the form of a computer system 500 within which a set of instructions, when executed, may cause the machine to perform any one or more of the methods described above. One or more instances of the machine can operate, for example, as processor 302, vHSS 111, vTAS 112, DNS 116, vSBC 153, and other devices of FIG. 1. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 7A:
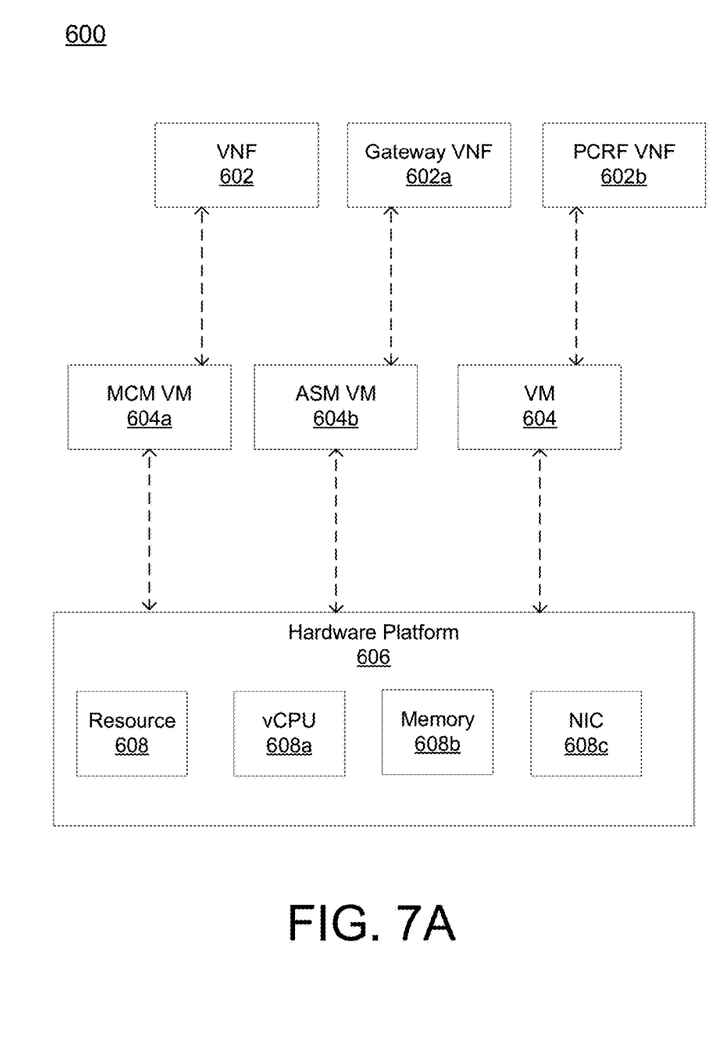
FIG. 7A is a representation of an exemplary network.

FIG. 7A is a representation of an exemplary network 600. Network 600 may comprise an SDN—that is, network 600 may include one or more virtualized functions implemented on general purpose hardware, such as in lieu of having dedicated hardware for every network function. That is, general purpose hardware of network 600 may be configured to run virtual network elements to support communication services, such as mobility services, including consumer services and enterprise services. These services may be provided or measured in sessions.

A virtual network functions (VNFs) 602 may be able to support a limited number of sessions. Each VNF 602 may have a VNF type that indicates its functionality or role. For example, FIG. 7A illustrates a gateway VNF 602a and a policy and charging rules function (PCRF) VNF 602b. Additionally or alternatively, VNFs 602 may include other types of VNFs. Each VNF 602 may use one or more virtual machines (VMs) 604 to operate. Each VM 604 may have a VM type that indicates its functionality or role. For example, FIG. 7A illustrates a management control module (MCM) VM 604a, an advanced services module (ASM) VM 604b, and a DEP VM 604c. Additionally or alternatively, VMs 604 may include other types of VMs. Each VM 604 may consume various network resources from a hardware platform 606, such as a resource 608, a virtual central processing unit (vCPU) 608a, memory 608b, or a network interface card (NIC) 608c. Additionally or alternatively, hardware platform 606 may include other types of resources 608.

Figure 7B:
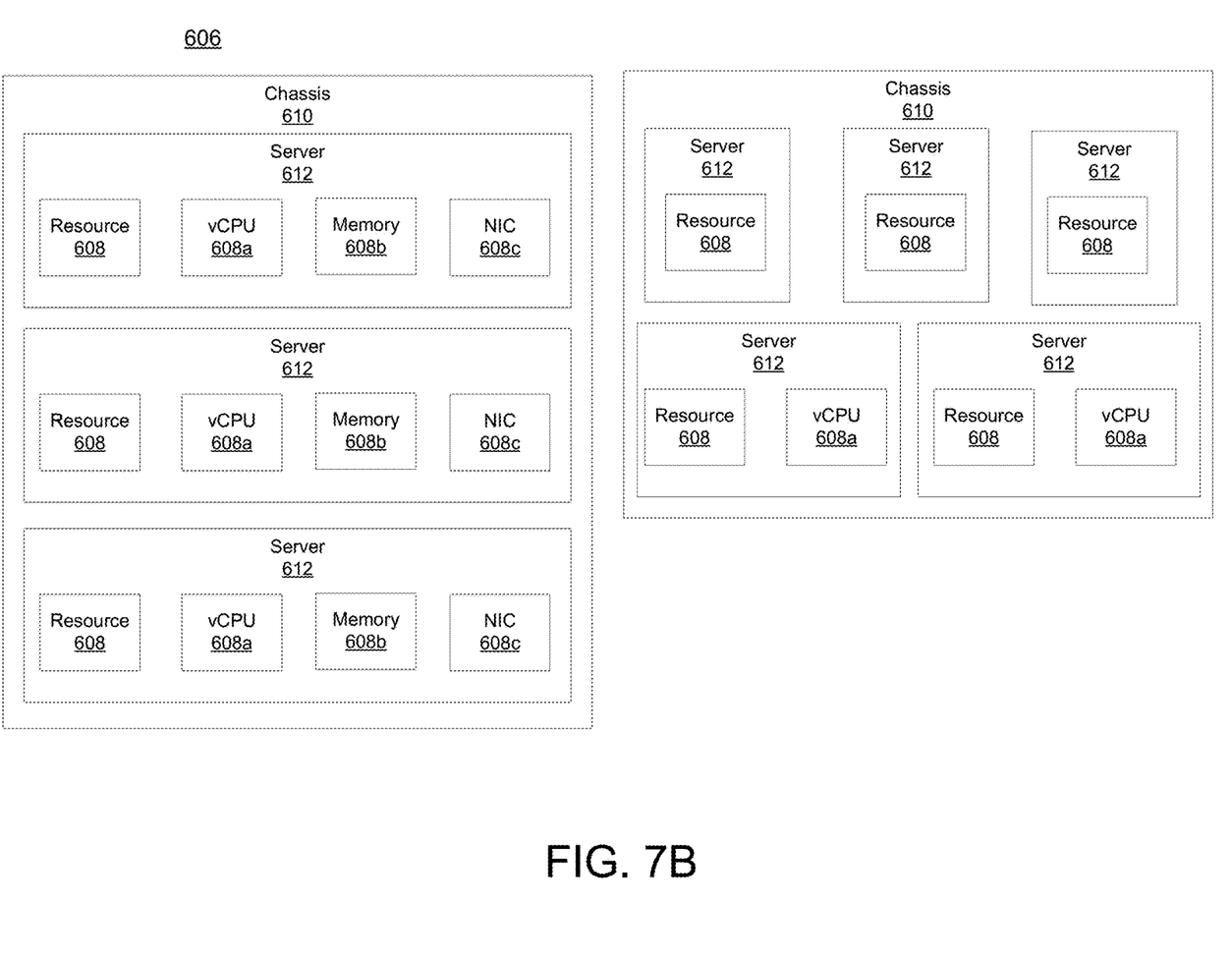
FIG. 7B is a representation of an exemplary hardware platform for a network.

While FIG. 7A illustrates resources 608 as collectively contained in hardware platform 606, the configuration of hardware platform 606 may isolate, for example, certain memory 608c from other memory 608c. FIG. 7B provides an exemplary implementation of hardware platform 606.

Hardware platform 606 may comprise one or more chasses 610. Chassis 610 may refer to the physical housing or platform for multiple servers or other network equipment. In an aspect, chassis 610 may also refer to the underlying network equipment. Chassis 610 may include one or more servers 612. Server 612 may comprise general purpose computer hardware or a computer. In an aspect, chassis 610 may comprise a metal rack, and servers 612 of chassis 610 may comprise blade servers that are physically mounted in or on chassis 610.

Each server 612 may include one or more network resources 608, as illustrated. Servers 612 may be communicatively coupled together (not shown) in any combination or arrangement. For example, all servers 612 within a given chassis 610 may be communicatively coupled. As another example, servers 612 in different chasses 610 may be communicatively coupled. Additionally or alternatively, chasses 610 may be communicatively coupled together (not shown) in any combination or arrangement.

The characteristics of each chassis 610 and each server 612 may differ. For example, FIG. 7B illustrates that the number of servers 612 within two chasses 610 may vary. Additionally or alternatively, the type or number of resources 610 within each server 612 may vary. In an aspect, chassis 610 may be used to group servers 612 with the same resource characteristics. In another aspect, servers 612 within the same chassis 610 may have different resource characteristics.

Given hardware platform 606, the number of sessions that may be instantiated may vary depending upon how efficiently resources 608 are assigned to different VMs 604. For example, assignment of VMs 604 to particular resources 608 may be constrained by one or more rules. For example, a first rule may require that resources 608 assigned to a particular VM 604 be on the same server 612 or set of servers 612. For example, if VM 604 uses eight vCPUs 608a, 1 GB of memory 608b, and 2 NICs 608c, the rules may require that all of these resources 608 be sourced from the same server 612. Additionally or alternatively, VM 604 may require splitting resources 608 among multiple servers 612, but such splitting may need to conform with certain restrictions. For example, resources 608 for VM 604 may be able to be split between two servers 612. Default rules may apply. For example, a default rule may require that all resources 608 for a given VM 604 must come from the same server 612.

An affinity rule may restrict assignment of resources 608 for a particular VM 604 (or a particular type of VM 604). For example, an affinity rule may require that certain VMs 604 be instantiated on (that is, consume resources from) the same server 612 or chassis 610. For example, if VNF 602 uses six MCM VMs 604a, an affinity rule may dictate that those six MCM VMs 604a be instantiated on the same server 612 (or chassis 610). As another example, if VNF 602 uses MCM VMs 604a, ASM VMs 604b, and a third type of VMs 604, an affinity rule may dictate that at least the MCM VMs 604a and the ASM VMs 604b be instantiated on the same server 612 (or chassis 610). Affinity rules may restrict assignment of resources 608 based on the identity or type of resource 608, VNF 602, VM 604, chassis 610, server 612, or any combination thereof.

An anti-affinity rule may restrict assignment of resources 608 for a particular VM 604 (or a particular type of VM 604). In contrast to an affinity rule—which may require that certain VMs 604 be instantiated on the same server 612 or chassis 610—an anti-affinity rule requires that certain VMs 604 be instantiated on different servers 612 (or different chasses 610). For example, an anti-affinity rule may require that MCM VM 604a be instantiated on a particular server 612 that does not contain any ASM VMs 604b. As another example, an anti-affinity rule may require that MCM VMs 604a for a first VNF 602 be instantiated on a different server 612 (or chassis 610) than MCM VMs 604a for a second VNF 602. Anti-affinity rules may restrict assignment of resources 608 based on the identity or type of resource 608, VNF 602, VM 604, chassis 610, server 612, or any combination thereof.

Within these constraints, resources 608 of hardware platform 606 may be assigned to be used to instantiate VMs 604, which in turn may be used to instantiate VNFs 602, which in turn may be used to establish sessions. The different combinations for how such resources 608 may be assigned may vary in complexity and efficiency. For example, different assignments may have different limits of the number of sessions that can be established given a particular hardware platform 606.

For example, consider a session that may require gateway VNF 602a and PCRF VNF 602b. Gateway VNF 602a may require five VMs 604 instantiated on the same server 612, and PCRF VNF 602b may require two VMs 604 instantiated on the same server 612. (Assume, for this example, that no affinity or anti-affinity rules restrict whether VMs 604 for PCRF VNF 602b may or must be instantiated on the same or different server 612 than VMs 604 for gateway VNF 602a.) In this example, each of two servers 612 may have sufficient resources 608 to support 10 VMs 604. To implement sessions using these two servers 612, first server 612 may be instantiated with 10 VMs 604 to support two instantiations of gateway VNF 602a, and second server 612 may be instantiated with 9 VMs: five VMs 604 to support one instantiation of gateway VNF 602a and four VMs 604 to support two instantiations of PCRF VNF 602b. This may leave the remaining resources 608 that could have supported the tenth VM 604 on second server 612 unused (and unusable for an instantiation of either a gateway VNF 602a or a PCRF VNF 602b). Alternatively, first server 612 may be instantiated with 10 VMs 604 for two instantiations of gateway VNF 602a and second server 612 may be instantiated with 10 VMs 604 for five instantiations of PCRF VNF 602b, using all available resources 608 to maximize the number of VMs 604 instantiated.

Consider, further, how many sessions each gateway VNF 602a and each PCRF VNF 602b may support. This may factor into which assignment of resources 608 is more efficient. For example, consider if each gateway VNF 602a supports two million sessions, and if each PCRF VNF 602b supports three million sessions. For the first configuration—three total gateway VNFs 602a (which satisfy the gateway requirement for six million sessions) and two total PCRF VNFs 602b (which satisfy the PCRF requirement for six million sessions)—would support a total of six million sessions. For the second configuration—two total gateway VNFs 602a (which satisfy the gateway requirement for four million sessions) and five total PCRF VNFs 602b (which satisfy the PCRF requirement for 15 million sessions)—would support a total of four million sessions. Thus, while the first configuration may seem less efficient looking only at the number of available resources 608 used (as resources 608 for the tenth possible VM 604 are unused), the second configuration is actually more efficient from the perspective of being the configuration that can support more the greater number of sessions.

To solve the problem of determining a capacity (or, number of sessions) that can be supported by a given hardware platform 605, a given requirement for VNFs 602 to support a session, a capacity for the number of sessions each VNF 602 (e.g., of a certain type) can support, a given requirement for VMs 604 for each VNF 602 (e.g., of a certain type), a give requirement for resources 608 to support each VM 604 (e.g., of a certain type), rules dictating the assignment of resources 608 to one or more VMs 604 (e.g., affinity and anti-affinity rules), the chasses 610 and servers 612 of hardware platform 606, and the individual resources 608 of each chassis 610 or server 612 (e.g., of a certain type), an integer programming problem may be formulated.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which call processing continuity can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—call processing continuity—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. An apparatus comprising:
    a processor; and
    a memory coupled with the processor, the memory storing executable instructions that when executed by the processor cause the processor to effectuate operations comprising:
        obtaining information associated with transition of communication sessions control from a first instance of a virtual network function (VNF) to a second instance of the VNF, the information comprising a threshold time to begin duplication of state data;
        determining that the threshold time to begin duplication of state data is reached;
        based on the determining that the threshold time to begin duplication of state data is reached, duplicating state data from a first state database associated with the first instance of the VNF to a second state database associated with the second instance of the VNF;
        determining that a threshold time to alter connectivity is reached; and
        based on the determining that the threshold time to alter the connectivity is reached, providing instructions to alter a domain name system (DNS) record for the first instance of the VNF.

2. The apparatus of claim 1, wherein the DNS record comprises a fully qualified domain name.

3. The apparatus of claim 1, wherein the DNS record comprises a IPv6 address record.

4. The apparatus of claim 1, the operations further comprising, based on the DNS record being altered, sending an alert message that provides instructions to shutdown the first instance of the VNF.

5. The apparatus of claim 1, the operations further comprising, based on the DNS record being altered, providing instructions to shutdown the first instance of the VNF.

6. The apparatus of claim 1, wherein the instructions to alter the DNS record is sent to a call continuity agent.

7. The apparatus of claim 1, wherein the instructions to alter the DNS record is sent from a call continuity controller.

8. A method comprising:
    obtaining information associated with transition of communication sessions control from a first instance of a virtual network function (VNF) to a second instance of the VNF, the information comprising a threshold time to begin duplication of state data;
    determining that the threshold time to begin duplication of state data is reached;
    based on the determining that the threshold time to begin duplication of state data is reached, duplicating state data from a first state database associated with the first instance of the VNF to a second state database associated with the second instance of the VNF;
    determining that a threshold time to alter connectivity is reached; and
    based on the determining that the threshold time to alter the connectivity is reached, providing instructions to alter a domain name system (DNS) record for the first instance of the VNF.

9. The method of claim 8, wherein the DNS record comprises a fully qualified domain name.

10. The method of claim 8, wherein the DNS record comprises a IPv6 address record.

11. The method of claim 8, further comprising, based on the DNS record being altered, sending an alert message that provides instructions to shutdown the first instance of the VNF.

12. The method of claim 8, further comprising, based on the DNS record being altered, providing instructions to shutdown the first instance of the VNF.

13. The method of claim 8, wherein the instructions to alter the DNS record is sent to a call continuity agent.

14. The method of claim 8, wherein the instructions to alter the DNS record is sent from a call continuity controller.

15. A computer readable storage medium storing computer executable instructions that when executed by a computing device cause said computing device to effectuate operations comprising:
    obtaining information associated with transition of communication sessions control from a first instance of a virtual network function (VNF) to a second instance of the VNF, the information comprising a threshold time to begin duplication of state data;
    determining that the threshold time to begin duplication of state data is reached;
    based on the determining that the threshold time to begin duplication of state data is reached, duplicating state data from a first state database associated with the first instance of the VNF to a second state database associated with the second instance of the VNF;
    determining that a threshold time to alter connectivity is reached; and based on the determining that the threshold time to alter the connectivity is reached, providing instructions to alter a domain name system (DNS) record for the first instance of the VNF.

16. The computer readable storage medium of claim 15, wherein the DNS record comprises a fully qualified domain name.

17. The computer readable storage medium of claim 15, wherein the DNS record comprises a IPv6 address record.

18. The computer readable storage medium of claim 15, the operations further comprising, based on the DNS record being altered, sending an alert message that provides instructions to shutdown the first instance of the VNF.

19. The computer readable storage medium of claim 15, wherein the instructions to alter the DNS record is sent to a call continuity agent.

20. The computer readable storage medium of claim 15, wherein the instructions to alter the DNS record is sent from a call continuity controller.

* * * * *